No. 742,040. Patented October 20, 1903.

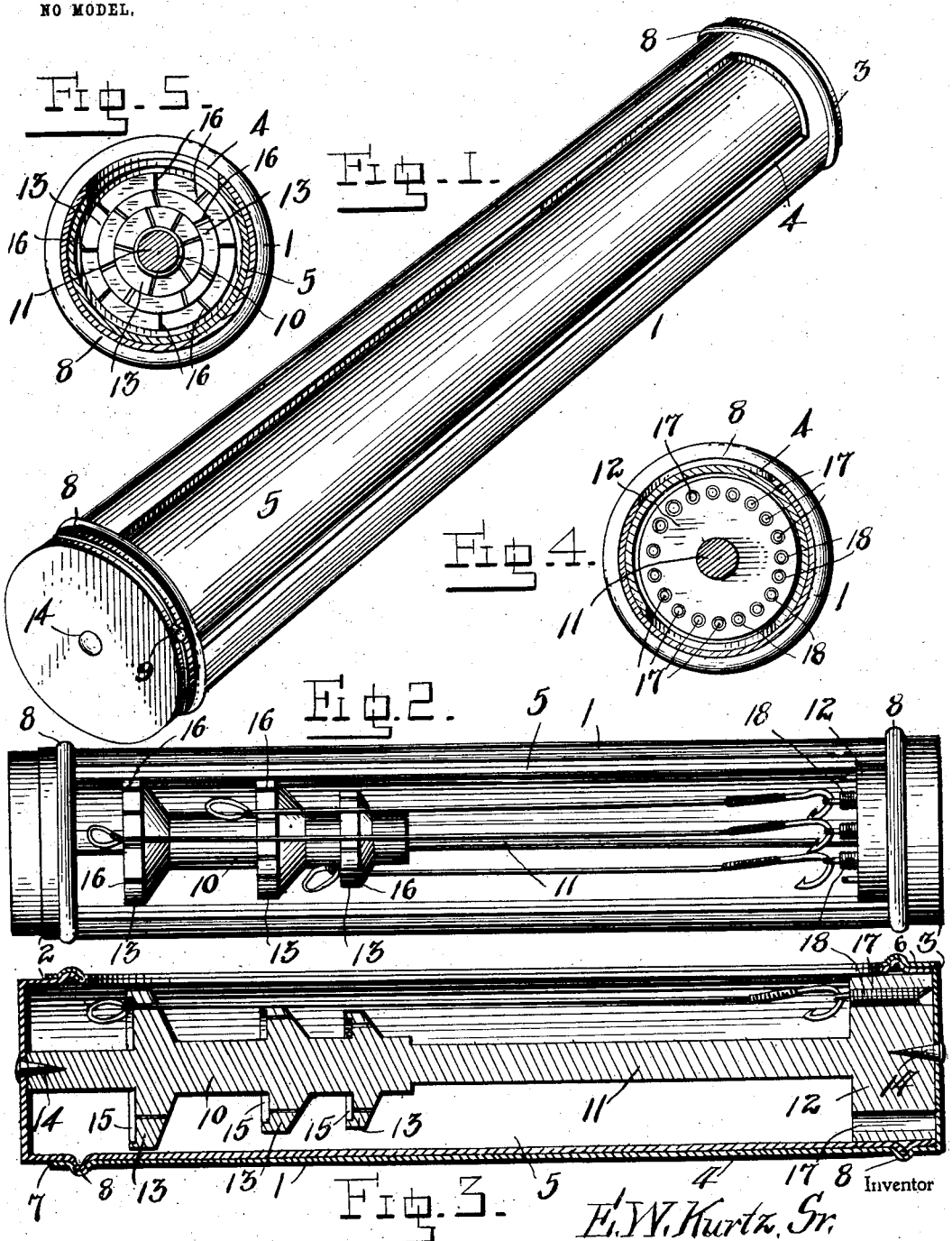

UNITED STATES PATENT OFFICE.

EDWARD W. KURTZ, SR., OF CHICAGO, ILLINOIS.

FISH-HOOK HOLDER.

SPECIFICATION forming part of Letters Patent No. 742,040, dated October 20, 1903.

Application filed June 16, 1903. Serial No. 161,643. (No model.)

*To all whom it may concern:*

Be it known that I, EDWARD W. KURTZ, Sr., a citizen of the United States, residing at Chicago, in the county of Cook and State of Illinois, have invented certain new and useful Improvements in Fish-Hook Holders; and I do declare the following to be a full, clear, and exact description of the invention, such as will enable others skilled in the art to which it appertains to make and use the same.

My invention relates to fishing-tackle holders, and more particularly to that class designed for holding fish-hooks with catgut attached thereto.

The object of the invention is to provide a device of this character which will be of simple, durable, and comparatively inexpensive construction, which will be neat in design and convenient in use, and which will effectively hold the catgut stretched and in the proper shape.

With these and other objects in view the invention consists of certain novel features of construction, combination, and arrangement of parts, as will be more fully described, and particularly pointed out in the appended claims.

In the drawings, Figure 1 is a perspective view of the casing of the holder, showing the same closed. Fig. 2 is an elevation of the same, showing the casing open. Fig. 3 is a longitudinal sectional view through the device. Fig. 4 is a transverse sectional view through the device, showing the casing closed. Fig. 5 is a similar sectional view looking in the opposite direction and showing the casing opened.

Referring to the drawings by numerals, 1 denotes a suitable casing, preferably tubular in form, having an open end 2, a closed end 3, and a longitudinal opening 4 in the side of the same. The opening 4 is adapted to be closed by a rotary sliding cover or door 5, which is disposed within the casing 1. One end 6 of said cover abuts against the closed end 3 of the casing and acts as a bearing, and the opposite end 7 of the cover closes the open end 2 of the casing. The ends of the casing and the cover are knurled, as shown at 8, to prevent the cover being removed from the casing, and the end 7 of the cover is provided with a knob 9 to enable the cover to be readily turned. Within the casing is revolubly mounted a holder 10, consisting of a shaft 11, formed at one end with a cylindrical block or head 12 and adjacent to its opposite end with a series of disks 13. The ends of said shaft are journaled, by means of pins or studs 14, in the closed end 3 of the casing and the end 7 of the cover, so as to permit said shaft to be readily revolved. The disks 13, of which any number may be used, are graduated in size to accommodate catgut of different lengths, as illustrated in the drawings. Each disk is dished or hollowed, as shown at 15, and provided around its periphery with the slits or notches 16, in which the catgut upon the fish-hooks is inserted. The block or head 12 is provided adjacent to its periphery or outer surface with a series of longitudinal bores 17, in which coil-springs 18 are secured. The hooks or eyes upon the inner ends of said springs are adapted to be engaged by the fish-hooks, as shown in Figs. 2 and 3 of the drawings.

In using the device the cover 5 is turned so as to uncover the opening 4 in the casing and expose the holder 10, which may then be revolved to bring any portion of the same into the opening 4. In securing the hooks to the holder the hook is first engaged with one of the coil-springs 18, and the catgut upon the same is stretched and inserted in one of the slits or notches 16 in one of the disks 13. The loop or eye upon the end of the catgut will engage with the flange formed by dishing the portion 15 of the disk, and casual disengagement of the gut is thus prevented. The springs 18 will keep the catgut stretched taut, but will yield sufficiently when the fish-hook is removed from the holder to permit the loop or eye upon the gut to be disengaged from the disk.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A device of the class described, comprising a shaft having a disk provided with fish-hook-engaging means, and a disk, spaced from the first-mentioned disk and having snell-engaging means.

2. A device of the class described, comprising a shaft having a disk at one end provided with fish-hook-engaging means, and a plurality of spaced disks of varying diameters at the opposite end provided with snell-engaging means.

3. A device for holding fish-hooks, comprising a suitable casing, a revoluble shaft mounted therein, a disk upon one end of said shaft provided with slits or notches in its periphery, a head upon the opposite end of said shaft provided with longitudinal bores, and springs mounted in said bores, substantially as described.

4. A device for holding fish-hooks, comprising a suitable casing, a revoluble shaft journaled in said casing, a plurality of graduated disks adjacent to one end of said shaft, said disks being notched or slitted and dished to form an annular flange, a head upon the opposite end of said shaft provided with a plurality of bores, and coil-springs secured in said bores, substantially as described.

5. In a device of the character described, the combination with a tubular casing having a rotary sliding cover, of a revoluble fish-hook holder mounted therein and means upon said holder for stretching the catgut attached to the fish-hooks, substantially as described.

In testimony whereof I have hereunto set my hand in presence of two subscribing witnesses.

EDWARD W. KURTZ, Sr.

Witnesses:
CHARLES L. KLINE,
FRED NIEMANN.